No. 821,868. PATENTED MAY 29, 1906.
E. GRIMME.
ARMOR FOR CYCLE TIRES.
APPLICATION FILED APR. 27, 1905.
2 SHEETS—SHEET 1.
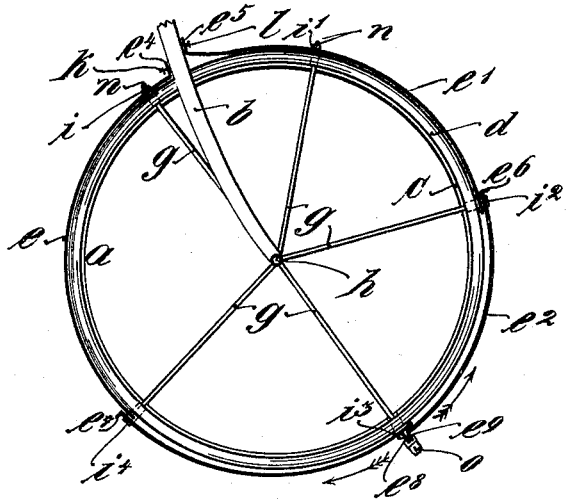
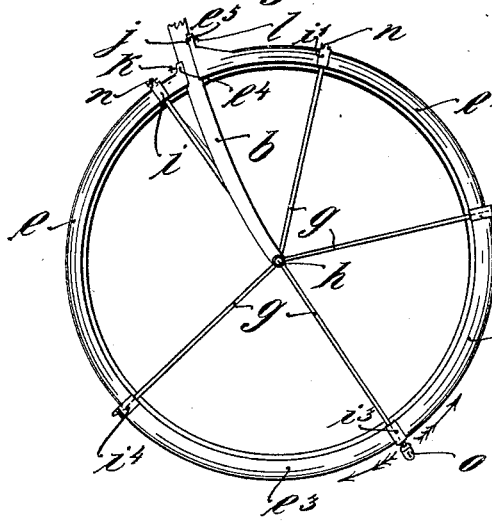
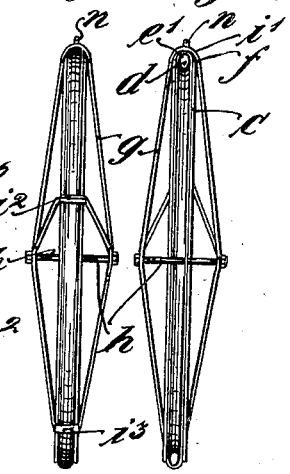
Witnesses:
Hans Müller.
Hans Ernst.
Inventor:
Emanuel Grimme

UNITED STATES PATENT OFFICE.

EMANUEL GRIMME, OF DITTERSBACH, GERMANY.

ARMOR FOR CYCLE-TIRES.

No. 821,868.  Specification of Letters Patent.  Patented May 29, 1906.

Application filed April 27, 1905. Serial No. 257,687.

*To all whom it may concern:*

Be it known that I, EMANUEL GRIMME, a subject of the German Emperor, residing at Dittersbach, in the Province of Schlesien, Germany, have invented certain new and useful Improvements in Armor for Cycle-Tires; and I do hereby declare the following to be a full, clear, and exact description of the invention, such as will enable others skilled in the art to which it appertains to make and use the same.

My invention relates to armor for cycle-tires to preserve the latter from damage during transit. The armor also serves to prevent the cycle being so easily stolen when left standing in a public place or from being ridden by unauthorized persons.

The device consists of a composite guard, preferably of metal, covering the tire of the wheel and comprising a plurality of parts or sections, some of which are adapted to slide back upon the others, so that a portion of the tire can be exposed when the cycle is to be ridden. If the sections in the extended position are secured together by a padlock or the like, it is impossible to wheel the cycle away or to ride off on it, so that a cycle armored according to this invention is less liable to be stolen than an unarmored machine.

My invention is illustrated in the accompanying drawings, in which—

Figure 5:
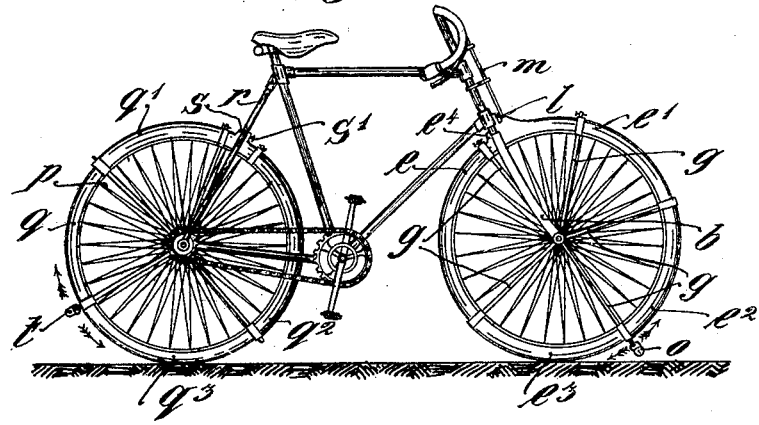
Figure 6:
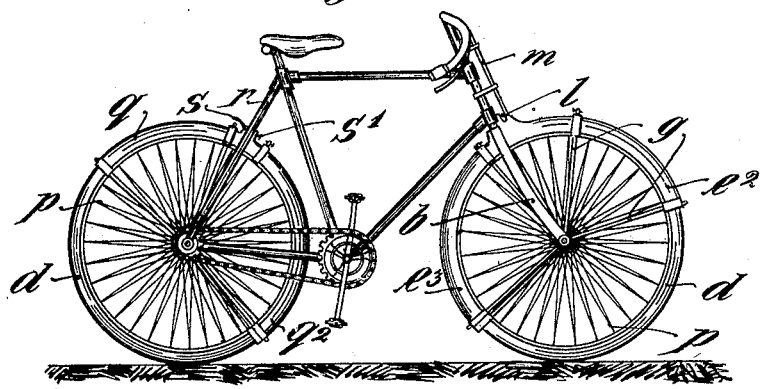

Figure 1 is an elevation of the steering-wheel of a bicycle fitted with the new armor, the latter being shown in section. Fig. 2 is an elevation of the armored wheel. Fig. 3 is an end elevation of the wheel. Fig. 4 is a vertical section through the wheel. Fig. 5 is an elevation of an armored bicycle ready for transit. Fig. 6 is a like view showing the machine in condition for riding.

$a$ is the steering-wheel of a cycle, and $b$ a portion of the front fork.

$c$ is the felly or rim of the wheel, and $d$ the rubber tire.

$e$ $e'$ $e^2$ $e^3$ are four guards of such section that their edges fit into the lateral grooves $f$ of the rim $c$, while their face entirely covers the tread of the tire $d$.

$g$ represents stays secured at their inner end to the wheel-hub $h$ and at their outer end to the bridge pieces or yokes $i$ to $i^4$, extending over the guards $e$ to $e^3$. At the steering-head the sections $e$ $e'$ may be secured to the handle-bar stem $j$ by means of thumb-screws $k$ $l$, passing through flanges $e^4$ $e^5$. When a brake is employed, the section $e'$ must be slotted to receive the brake-rod $m$, Figs. 5 and 6. The tops of the yokes $i$ to $i^4$ do not lie close against the guards, there being sufficient space left to allow passage of the sections $e^2$ $e^3$, respectively. These latter sections are furnished with studs $e^6$ $e^7$, which when the sections $e^2$ $e^3$ are drawn over the tire act as stops by butting against the adjacent yokes. When the cycle is to be ridden, the two sliding sections must be pushed or drawn back, as shown in Fig. 6, and can be secured in such position by means of thumb-screws $n$ $n$, or in place of such screws springs or the like might be employed. The yoke $i^3$, with its stay $g$, being secured to the sections $e^3$, travels back with the latter, as shown in Fig. 6. The two sliding sections may be provided with perforated lugs $e^8$ $e^9$, so that the two parts may be secured by a padlock $o$.

It must be clearly understood that I do not in any way desire to restrict myself to the precise details of construction shown, as it is obvious that these may be greatly varied without departure from the essential features of the invention. Thus, for instance, the particular disposal of the stays and yokes may be any desired, and the number of guards might be other than that shown. The grooves and yokes also may be replaced by other suitable guiding and fastening means.

The driving-wheel $p$ is armored with guards $q$ $q'$ $q^2$ $q^3$ in similar manner to the wheel $a$. The sliding sections $q$ $q^3$ are shown padlocked at $t$ in Fig. 5, while the stationary sections are secured to the rear fork $r$ at $s$ $s'$.

I claim—

1. Armor for cycle-wheels, comprising a plurality of stationary and movable guards covering the tire, the stationary guards being secured to a suitable part of the cycle, while the movable ones slide on the stationary ones, a plurality of pairs of radial stays secured to the ends of the hub of the wheel, and bridging over the guards, and means for securing the guards in the position in which they have been adjusted, substantially as described.

2. In combination, wheels having a laterally-grooved rim, a plurality of stationary and movable guards covering the tire, with their edges fitting into the grooves in the wheel-rim, the stationary guards being secured to a suitable part of the cycle, while the movable ones slide on the stationary ones, a plurality of pairs of radial stays secured to the ends of the hub of the wheel, and bridging over the guards, and means for securing the guards in the position in which they have been adjusted, substantially as described.

3. In combination, wheels having a laterally-grooved rim, a plurality of stationary and movable guards covering the tire, with their edges fitting into the grooves in the wheel-rim, the stationary guards being secured to a suitable part of the cycle, while the movable ones slide on the stationary ones, a plurality of pairs of radial stays secured to the ends of the hub of the wheel, and bridging over the guards, means for securing the sliding guards in their retracted position, and means for locking them in their extended position, substantially as described.

In testimony whereof I affix my signature in presence of two witnesses.

EMANUEL GRIMME.

Witnesses:
LOUIS WIATZ,
ALBERT SCHENK.